United States Patent [19]
Zeidler

[11] Patent Number: 5,937,603
[45] Date of Patent: Aug. 17, 1999

[54] WEATHER RESILIENT ROOF COVERING SYSTEM

[76] Inventor: Bernard Zeidler, 150-15-72 Rd. St A, Flushing, N.Y. 11367

[21] Appl. No.: 08/788,255

[22] Filed: Jan. 24, 1997

Related U.S. Application Data

[60] Continuation-in-part of application No. 08/520,244, Aug. 28, 1995, Pat. No. 5,733,408, which is a division of application No. 08/226,078, Apr. 11, 1994, abandoned, which is a continuation-in-part of application No. 07/926,196, Aug. 7, 1992, abandoned.

[51] Int. Cl.$^6$ ............................... E04D 1/36; E04D 13/14
[52] U.S. Cl. ................................... 52/408; 52/58; 52/61; 52/219
[58] Field of Search .................... 52/58, 60, 61, 52/62, 218, 219

[56] References Cited

U.S. PATENT DOCUMENTS

| | | | |
|---|---|---|---|
| 3,277,618 | 10/1966 | Smith . | |
| 3,731,439 | 5/1973 | Hickman . | |
| 4,841,687 | 6/1989 | Navetta | 52/58 |
| 4,888,930 | 12/1989 | Kelly | 52/62 X |
| 5,027,572 | 7/1991 | Purcell et al. | 52/62 X |
| 5,365,703 | 11/1994 | Zeidler | 52/218 X |
| 5,381,632 | 1/1995 | Damron | 52/60 X |

*Primary Examiner*—Carl D. Friedman
*Assistant Examiner*—Brian E. Glessner
*Attorney, Agent, or Firm*—Judith Adele Plotkin

[57] ABSTRACT

Improvements in a roof covering system include the use of flexible pouches containing heavy, dense materials such as dense oil and sand. These pouches are compressed between supports, such as parapet walls and pipes, and fixtures mounted on the supports, resulting in improved sealing against water seepage into the roof.

Another improvement is in the provision of a storage tank of sealing material such as tar to help maintain the level required for adequate protection of roofing materials against adverse weather conditions. The additional provision of a wetted layer between two water impermeable layers allows for better temperature control of the roofing materials. Temperature controlled water can be circulated through this wetted layer using a system of spiralling pipes with an underground water storage area of larger spiral piping.

16 Claims, 2 Drawing Sheets

WEATHER RESILIENT ROOF COVERING SYSTEM

This application is a continuation-in-part of application Ser. No. 08/520,244 filed Aug. 28, 1995, now U.S. Pat. No. 5,733,408 which is a division of application Ser. No. 08/226,078 which was filed on Apr. 11, 1994, abandoned which is a continuation-in-part of U.S. application Ser. No. 07/926,196, filed on Aug. 7, 1992, abandoned.

BACKGROUND

The novel invention described herein relates to an improved roof covering system with improvements in resistance to water seapage and leaks, in temperature control, in ability to withstand adverse weather conditions, in ease of construction, and in ease of maintenance.

U.S. Pat. No. 5,365,703 describes a tar holder in which the ends of the roof covering materials curve upwards behind a flashing and are overlapped by the lower portion of the tar holder. A means to affix the tar holder on an upright structure is also included. The present invention provides improvements in this means as well as in the way the tar is provided to the holders. Both the contents of U.S. Pat. No. 5,365,703 and of U.S. application Ser. No. 08/520,244 filed Aug. 28, 1995, patent pending, are included herewith by reference in their entirety.

The latter describes the preparation of thermoplastic covering layers formed in situ with a novel high temperature pressure roller. The layers are seamless after compression and fusion treatment resulting in durable, resilient, waterproof, weather resistant roof covering materials.

Also described is the inclusion of a layer with an embedded wetting system providing temperature controlled water. The water supply has a means by which it can be supplemented by rain water and circulated by a solar powered pump.

The Figures discussed herein illustrate embodiments of this invention. However changes within the scope of this specification can be made in the specific constructions illustrated and described within the appended claims.

SUMMARY OF THE INVENTION

The present invention provides for improved weather resistance, waterproofing, temperature control, and leakage avoidance in roofing systems.

Further, the present invention has improved ease of construction and maintenance as compared to prior art systems.

The present invention further includes an improved means to affix tar holders to structures. Additionally, an improved means for supplying the tar to the holders is described. Also improved temperature control for the system through usage of the wetted layer properties is another object of this invention.

BRIEF DESCRIPTION OF THE FIGURES

FIG. 3 shows the use of a lightweight, flexible, thermoplastic roof covering material which was pre-fabricated in one piece according to the specific measurements of the roof to be covered. FIG. 3A shows the rolled up roofing material prior to lay down while

DETAILED DESCRIPTION OF THE PREFERRED EMBODIMENTS

The present invention is an improved roof covering system including better means to seal attachment sites for tar holders, pipe fittings, roofing material segments, etc. A key improvement is the inclusion of flexible pouches of a heavy, dense material as seal inserts between supporting surfaces and attachments such as tar holders, flanges, covers for tar holders, etc. The dense material is one that either does not absorb water or, if it does absorb some water, it does not release the water and allow the water to drip onto the roofing materials. This material can be tar, however used heavy oils also work and would be less costly. Other such materials can be used instead of or combined with the oil or tar. Sand is optionally mixed with the dense fluid to increase the heaviness. The pouches are of any shape needed for sealing sites of potential leaks.

Figure 1:
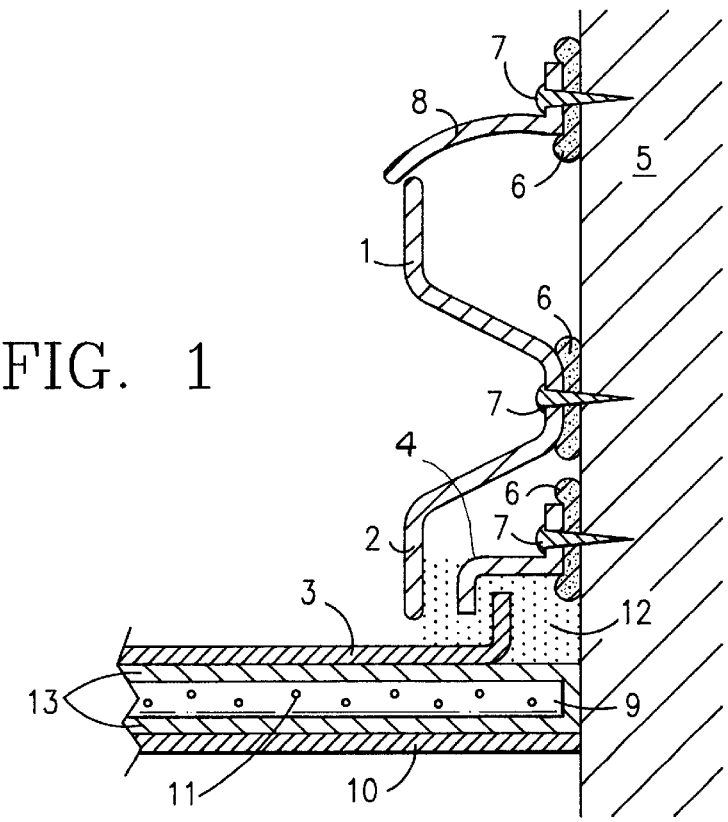
FIG. 1 depicts a roofing system which includes a covered tar-holder and roof covering materials, including a wetted layer, and which is attached to a wall.

One way these pouches are used is depicted in FIG. 1. The pouches (6) are placed between a wall or parapet (5) and fixtures to be attached thereto using a means of attachent (7) such as nails or screws. The fixtures shown are a flange (4), a tar holder including upper (1) and lower (2) portions, and an openable cover (8) for the tar holder. As the nails or screws pierce the pouches, some of the heavy, dense contents flow out into the gaps around the attachment means, between the pouch and the wall, and between the pouch and the fixtures. The resultant sealing effect better prevents water seaping into roofing system.

The cover or lid (8) helps to prevent moisture from dripping or raining into the tar holder. The top layer of roofing material (3) curls up into a tar pocket (12) between the flange (4) and the wall (5). While this configuration provides a leak-free seal, a second seal is optionally provided by the placement of an elongated pouch of the dense material as described above (not shown) on the top layer of roofing material (3) as close to the wall (5) as possible. Even if no tar is available, this configuration will provide adequate sealing against the ingress of water into the roofing layers. Alternatively, sealing materials other than tar can be used in this system.

Figure 5:
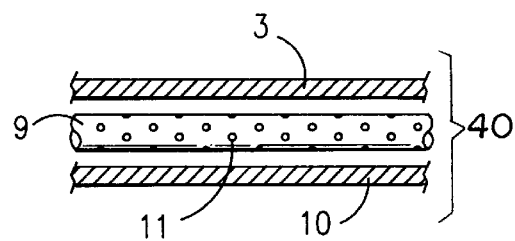
FIG. 5 depicts a possible layer combination in which a wetted layer containing a water conduit with many holes is sandwiched between two waterproof or water impermeable layers.

In this embodiment there are three layers which are also depicted in FIG. 5. The top (3) layer is waterproof or water impermeable plastic as is the bottom layer (10). The second layer comprises a network of pipes (9) with many holes (11) surrounded by sponge or other highly porous material enclosed in water impermeable membranes or coatings (13). Water is circulated through this layer in order to provide temperature control to the roofing system. During the winter the water is optionally heated by solar collectors and/or home heating means. During the summer, cool water stored underground is circulated onto the roof for cooling down the roofing materials. Sensors are optionally used to determine the roofing temperature and control the heating or cooling process according to the desired temperature range.

Figure 4:
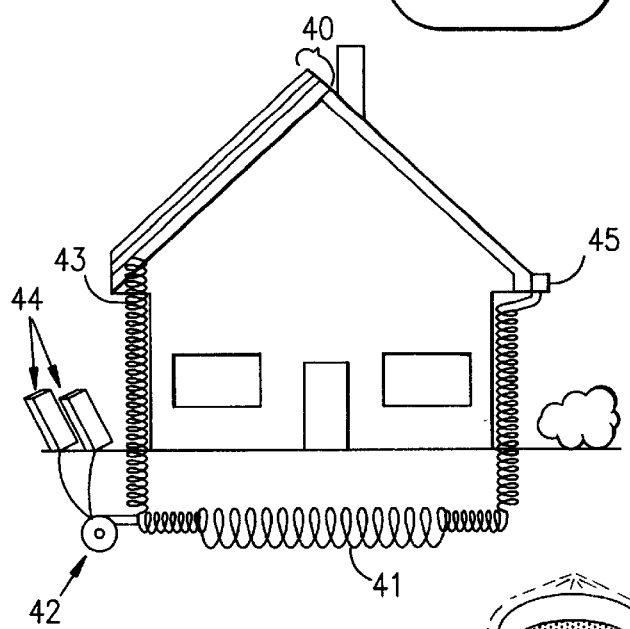
FIG. 4 shows a water conduit and storage system used to water the wetted layer.

FIG. 4 shows on economic way to store and circulate water through the wetted layer in the roof covering materials (40). Rain run-off is directed from the gutter (45) to underground storage are (41) by piping spirally downward to the wider pipes of the larger spirals of the storage area (41). Water level is adjusted by the addition of tap, aquifer, well, or other water. Sensors are optionally provided to control the water level automatically.

The spiral configuration reduces the amount of pumping required to circulate the water through the roofing system. A pump (42) is shown as solar powered from solar panels (44). This pump is also powered with household fuel or electricity when inadequate solar energy is available. For most spiral systems a 12 volt rechargeable battery is sufficient to circulate the water up through spiral (43) which is relatively narrow in pipe diameter and spiral width when compared to the spiral width and pipe diameter in the underground storage area.

Figure 6:
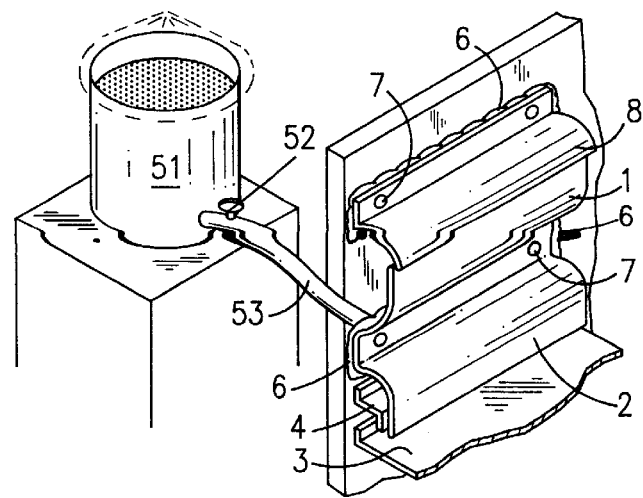
FIG. 6 depicts another perspective of a roof covering system which includes a covered tar holder and a roof covering layer along with a supply tank for adding tar as needed.

The roofing system of FIG. 1 is seen in a different perspective in FIG. 6 along with optionally heated tank (51) for tar or other sealing fluid. Sensors in the tar holders and roofing layers for temperature, level of tar, etc. are optionally used to open and close valve (52). when needed in order to adjust the temperature, maintain seals, and/or prevent brittleness in the roof covering layers. Of particular concern is the adequate maintenance of the top, water impermeable layer (3).

One way this layer is formed is in situ using the method described in application Ser. No. 08/520,244 cited above. Alternatively, measurements of the roof area to be covered are taken to make a pattern by which the roofing material is prepared in a factory. The method used is similar to the in situ method. A layer of thermoplastic fibers is laid out on a release sheet or material in the desired pattern. Compression and high temperature fusion is done under conditions which exclude further contact with ambient air or any other sources of oxygen. The resultant highly flexible, lightweight, thermoplastic layer is rolled up for transport to the roof site. This material, depicted in FIG. 3A (32), is easily unrolled as seen in FIG. 3B (33). The unrolled material is secured to the roof with tar holder set-ups such as those seen in FIGS. 1, 2, and 6. Polyesters optionally containing fillers are useful as this material.

Figure 2:
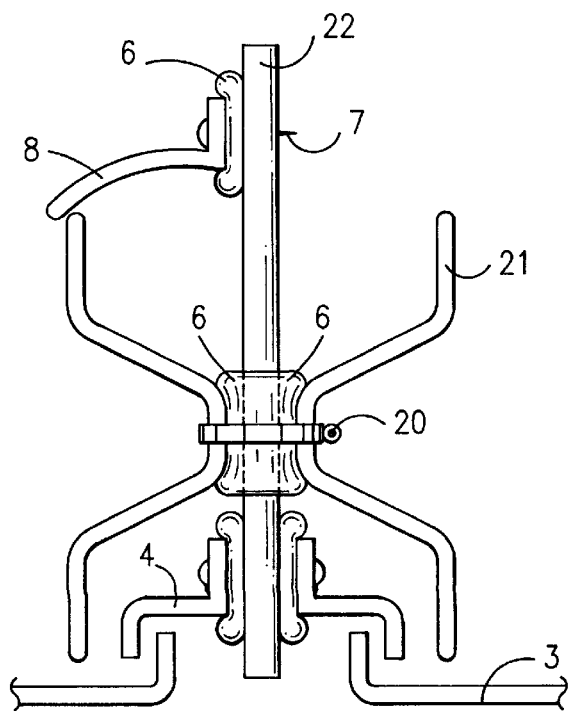
FIG. 2 depicts a similar roofing system attached to a pipe by a clamp.
Figure 3A:
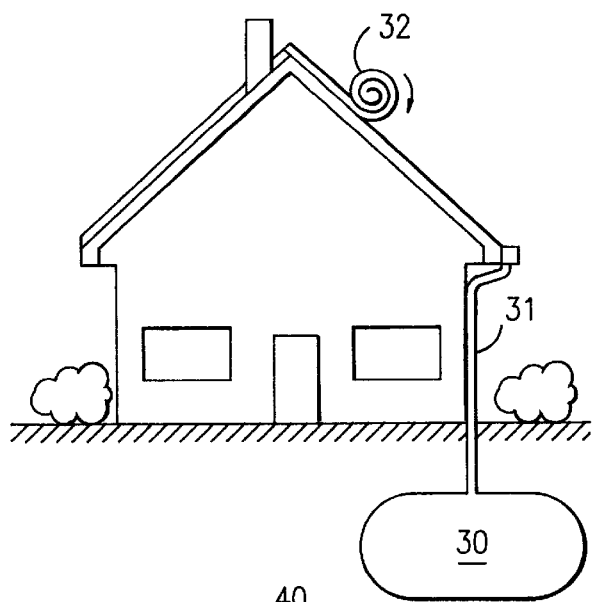
Figure 3B:
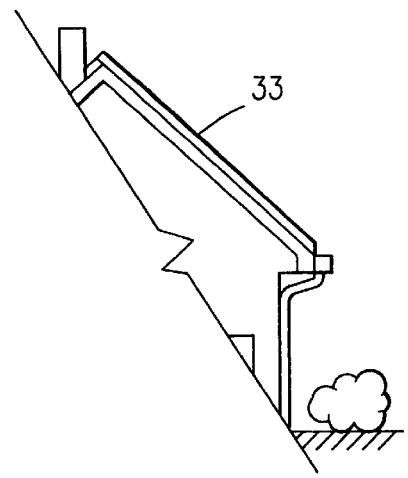
FIG. 3B shows the roofing material in place on the roof after unrolling.

FIG. 2 shows the tar holder set-up for use with a pipe (22), such as an air vent pipe. Instead of screws or nails, a clamp (20) is used to secure the tar holder (21) to the pipe (22). As in FIGS. 1 and 6, pouches (6) are compressed between the tar holder (21) and the support.

When improvements are done on pre-existing roof covering materials, long pouches of the heavy, dense fluid are put on any seams present. In this embodiment, the weight of the pouches keeps them in place. Their presence helps prevent leaks from cracks in old seams, a common problem in prior art roofing systems.

The embodiments described above and in the claims which follow are illustrative of the novel features of this invention. Although the preferred embodiments of the present invention have been fully described with reference to the accompanying drawings, various changes and modifications are apparent to those skilled in the art. Such changes and modifications are to be understood as within the scope of the present invention as defined by the appended claims, unless they depart therefrom.

What is claimed is:

1. A roof covering system comprising:
 a) an upright structure on a roof;
 b) a flashing mounted on said upright structure;
 c) a means affixing said flashing to said upright structure;
 d) a tar holder comprised of an upper portion, a lower portion, and an attachment site attaching said tar holder to said upright structure;
 e) a means affixing said tar holder to said upright structure;
 f) a means sealing gaps around said attachment site between said upright structure and said tar holder;
 g) a means sealing gaps between said flashing and said upright structure; and
 h) a waterproof roof covering material with a curved end which curves upward between said flashing and said upright structure;
 wherein said upper portion can be filled with a sealing material;
 wherein said lower portion overlaps said curved end of said roof covering material and forms a pocket for said sealing material to form a seal between said flashing and said roof covering material; and
 wherein said means sealing the gaps between said tar holder and said upright structure is comprised of a pouch filled with a heavy and dense material, said pouch compressed between said tar holder and said upright structure.

2. A roof covering system as recited in claim 1 in which said sealing material is selected from the group of tars, dense oils, and combinations thereof.

3. A roof covering system as recited in claim 1 in which said means affixing said tar holder to said structure is selected from the group of nails, screws, clamps, and combinations thereof.

4. A roof covering system as recited in claim 1 which further comprises a lid for said upper portion which can be opened.

5. A roofing covering system as recited in claim 1 which further comprises a tank filled with said sealing material and a conduit through which said sealing material can be added to said tar holder, wherein said tank is optionally temperature controlled.

6. A roof covering system as recited in claim 1 in which said roof covering material is a layer of water impermeable, lightweight, flexible, thermoplastic polymer.

7. A roof covering system as recited in claim 6 in which said layer is seamless after having been formed in situ under high temperature and pressure treatment.

8. A roof covering system as recited in claim 6 in which said layer is a seamless piece of thermoplastic polymer prefabricated to the dimensions of said roof.

9. A roof covering system as recited in claim 1 in which said roof covering material is comprised of a waterproof top layer and a wetted layer comprising a network of water conduits with holes through which water can wet the layer.

10. A roof covering system as recited in claim 9 which further comprises a means to store and circulate water between the roof and said means to store used in wetting said wetted layer.

11. A roof covering system as recited in claim 10 in which said means to store and circulate water is temperature controlled.

12. A roof covering system as recited in claim 10 in which said means to store and circulate water comprises spirals of pipes including water collection spirals, storage area spirals, and water return spirals;
 wherein said storage area spirals are larger in spiral width and in pipe diameter than said collection spirals and said return spirals.

13. A roof covering system as recited in claim 10 in which said means to store and circulate water includes a pump.

14. A roof covering system as recited in claim 13 in which said pump is solar powered and has a back-up power source for use when solar pump is inadequate.

15. A roof covering system comprising:
  a) an upright structure on a roof;
  b) at least two fixtures affixed to said upright structure wherein said at least two fixtures comprise a tar holder and a flashing,
  c) a means affixing said at least two fixtures to said upright structure;
  d) a means sealing gaps between said at least two fixtures and said upright structures;
  e) a seamless, flexible, lightweight, thermoplastic, water impermeable, polymeric roof covering material with ends between said flashing and said upright structure; and
  f) a means sealing gaps between said ends and and said upright structure and between said ends and said flashing;

wherein said means sealing gaps between said at least two fixtures and said upright structure is comprised of at least two flexible pouches filled with heavy and dense material, each of said at least two pouches compressed between one of said at least two fixtures and said upright structure.

16. A roof covering system as recited in claim 15 which further comprises at least one additional upright structure on said roof.

* * * * *